US011810005B2

(12) United States Patent
Sanghvi et al.

(10) Patent No.: US 11,810,005 B2
(45) Date of Patent: Nov. 7, 2023

(54) MACHINE LEARNING BASED AUTOMATED PAIRING OF INDIVIDUAL CUSTOMERS AND SMALL BUSINESSES

(71) Applicant: Bank of America Corporation, Charlotte, NC (US)

(72) Inventors: Siten Sanghvi, Westfield, NJ (US); Morgan S. Allen, Waxhaw, NC (US); Matthew E. Carroll, Charlotte, NC (US); Tamara S. Kingston, Peoria, AZ (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 16/941,858

(22) Filed: Jul. 29, 2020

(65) Prior Publication Data

US 2022/0036210 A1     Feb. 3, 2022

(51) Int. Cl.
*G06Q 30/02*     (2023.01)
*G06N 5/04*     (2023.01)
(Continued)

(52) U.S. Cl.
CPC .............. *G06N 5/04* (2013.01); *G06N 3/006* (2013.01); *G06N 20/00* (2019.01);
(Continued)

(58) Field of Classification Search
CPC ........... G06Q 30/0201; G06Q 30/0203; G06Q 30/0631; G06Q 30/08; G06Q 40/025
See application file for complete search history.

(56) References Cited

U.S. PATENT DOCUMENTS 7,748,614 B2    7/2010   Brown
8,135,634 B2    3/2012   Abeles
(Continued)

FOREIGN PATENT DOCUMENTS

WO      2013037044 A1    3/2013

OTHER PUBLICATIONS

"When AI meets your shopping experience it knows what you buy—and what you ought to buy" (Milford, Michael et al. Aug. 30, 2018 at https://theconversation.com/when-ai-meets-your-shopping-experience-it-knows-what-you-buy-and-what-you-ought-to-buy-101737) (Year: 2018).*
(Continued)

*Primary Examiner* — James M Detweiler
(74) *Attorney, Agent, or Firm* — Banner & Witcoff, Ltd.

(57) ABSTRACT

Aspects of the disclosure relate to automated pairing of customers and businesses. A computing platform may determine, based on historical user activity of a user, a pattern of the user activity, and may identify, based on the pattern of the user activity, an anticipated purchase activity of the user. Then, the computing platform may determine a sales offering by a vendor. Then, the computing platform may match the anticipated purchase activity with the sales offering. Then, the computing platform may retrieve user-defined preference rules associated with the anticipated purchase activity. Then, the computing platform may determine whether the preference rules apply to one or more attributes of the anticipated purchase activity. Subsequently, the computing platform may trigger, based on a determination that the preference rules apply to the one or more attributes of the anticipated purchase activity, an action associated with the anticipated purchase activity.

19 Claims, 5 Drawing Sheets

(51) Int. Cl.
  *G06N 20/00* (2019.01)
  *G06N 3/006* (2023.01)
  *G06Q 30/08* (2012.01)
  *G06Q 30/0203* (2023.01)
  *G06Q 30/0601* (2023.01)
  *G06Q 30/0201* (2023.01)
  *G06Q 30/016* (2023.01)
  *G06Q 40/03* (2023.01)

(52) U.S. Cl.
  CPC ..... *G06Q 30/0201* (2013.01); *G06Q 30/0203* (2013.01); *G06Q 30/0631* (2013.01); *G06Q 30/08* (2013.01); *G06Q 30/016* (2013.01); *G06Q 40/03* (2023.01)

(56) References Cited

U.S. PATENT DOCUMENTS

| | | | |
|---|---|---|---|
| 8,271,355 B2 | 9/2012 | Johnson et al. | |
| 8,302,852 B2 | 11/2012 | Brown | |
| 8,650,072 B2 | 2/2014 | Mason et al. | |
| 9,166,993 B1 | 10/2015 | Liu | |
| 9,390,410 B2 | 7/2016 | Casares et al. | |
| 10,346,869 B1 * | 7/2019 | Ahmed | G06Q 30/0226 |
| 10,592,961 B1 * | 3/2020 | Price | G06Q 30/0639 |
| 2013/0097002 A1 * | 4/2013 | Dishneau | G06Q 30/02 705/1.1 |
| 2014/0025453 A1 | 1/2014 | Knowles et al. | |
| 2014/0095285 A1 * | 4/2014 | Wadell | G06Q 30/00 705/26.7 |
| 2017/0351978 A1 | 12/2017 | Bellowe | |
| 2018/0107917 A1 * | 4/2018 | Hewavitharana | G06F 16/2468 |
| 2018/0247241 A1 | 8/2018 | Avrahami et al. | |
| 2018/0260875 A1 * | 9/2018 | Jayaraman | G06Q 30/0631 |
| 2019/0205839 A1 | 7/2019 | Dotan-Cohen et al. | |
| 2019/0287157 A1 * | 9/2019 | Rubin | G06Q 20/12 |
| 2020/0090261 A1 * | 3/2020 | Tumulty, II | G06Q 20/42 |
| 2020/0380481 A1 * | 12/2020 | Kalaboukis | G06Q 20/102 |

OTHER PUBLICATIONS

Mar. 29, 2022—U.S. Non-Final Office Action—U.S. Appl. No. 16/941,710.
Jun. 14, 2022—U.S. Final Office Action—U.S. Appl. No. 16/941,710.
Sep. 22, 2022—U.S. Non-Final Office Action—U.S. Appl. No. 16/941,710.
Jan. 17, 2023—U.S. Notice of Allowance—U.S. Appl. No. 16/941,710.
Apr. 13, 2023—(US0 Notice of Allowance—U.S. Appl. No. 16/941,710.

* cited by examiner

MACHINE LEARNING BASED AUTOMATED PAIRING OF INDIVIDUAL CUSTOMERS AND SMALL BUSINESSES

BACKGROUND

Aspects of the disclosure relate to deploying machine learning systems to predict customer needs. In particular, one or more aspects of the disclosure relate to machine learning based automated pairing of customers and businesses.

Enterprise organizations may utilize various computing infrastructure to provide services to their customers. Customers of the enterprise organization may include individuals and businesses. In some instances, a customer may make a purchase, and there may be business customers that have offerings that may be beneficial to a customer. Detecting a pattern of purchase activity for customers, and matching them to appropriate business customers, may be of high significance to an enterprise organization. In many instances, however, it may be difficult to ensure detection of such need, and connecting customers and businesses, while also attempting to optimize the resource utilization, bandwidth utilization, and efficient operations of the computing infrastructure involved in maintaining, accessing, and executing such purchase activities.

SUMMARY

Aspects of the disclosure provide effective, efficient, scalable, fast, reliable, and convenient technical solutions that address and overcome the technical problems associated with automated pairing of customers and businesses.

In accordance with one or more embodiments, a computing platform having at least one processor, and memory, may determine, via a computing device and based on historical user activity of a user, a pattern of the user activity. Subsequently, the computing platform may identify, based on the pattern of the user activity, one or more anticipated purchase activities of the user. Then, the computing platform may determine, via the computing device and based on the one or more anticipated purchase activities of the user, a sales offering by a vendor. Then, the computing platform may match, via the computing device, the one or more anticipated purchase activities of the user with the sales offering by the vendor. Then, the computing platform may retrieve, from a repository of user data and for a purchase activity of the one or more anticipated purchase activities, one or more user-defined preference rules associated with the purchase activity. Then, the computing platform may determine whether the one or more preference rules apply to one or more attributes of the purchase activity. Subsequently, the computing platform may trigger, via the computing device and based on a determination that the one or more preference rules apply to the one or more attributes of the purchase activity, an action associated with the purchase activity.

In some embodiments, the action associated with the purchase activity may include providing, via an intelligent virtual assistant, a recommendation to perform the purchase activity.

In some embodiments, the action associated with the purchase activity may include making an automatic purchase.

In some embodiments, the computing platform may retrieve, from one or more external sources of data, one or more events that may impact the purchase activity. Then, the computing platform may identify an event of the one or more events that impacts the purchase activity, where the action associated with the purchase activity comprises a recommendation that minimizes the impact of the event for the user. In some embodiments, the one or more external sources of data may be artificial intelligence based systems. In some embodiments, the event may include one or more of a weather related event, an employment related event, a geopolitical event, or the like.

In some embodiments, the computing platform may determine the one or more user-defined preference rules by establishing, via an intelligent virtual assistant, an interactive session with the user. Then, the computing platform may provide, to the user, one or more questions in sequential format. Then, the computing platform may receive, from the user, responses to the one or more questions. Subsequently, the computing platform may provide, to the user and based on the responses, one or more additional questions. Then, the computing platform may receive, from the user, responses to the one or more additional questions. In some embodiments, the computing platform may train the intelligent virtual assistant based on a machine learning model.

In some embodiments, the one or more user-defined preference rules may include one or more of a preference associated with an automatic loan amount, a secondary funding source, automatic payment options, a designated alternate decision making authority, and preferred communication channels.

In some embodiments, the computing platform may train a machine learning model to determine the pattern of the user activity.

In some embodiments, the computing platform may train a machine learning model to identify the one or more anticipated purchase activities of the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Customers of an enterprise organization may perform purchase related activities. In some instances, such activities may be in response to an event, such as a natural disaster, an illness, an accident, and so forth. For example, the customer may be undergoing a treatment, may have suffered an accident, may be in a disaster-struck region, may have lost employment, and so forth. Generally, such events may cause a customer to make certain purchases. Also, for example, a customer may make routine purchases and may be unaware of a type of alternate resources that may be available for the purchases. In some instances, an enterprise organization may be better able to serve its customers by understanding customer behavior, identifying offerings provided by business customers, and tailoring resources to the customers. Also, for example, the enterprise organization may tailor resources based on user-defined preferences. Accordingly, it may be of high significance for an enterprise organization to devise ways in which to provide tailored purchase resources to an enterprise user. Also, fast and reliable responses to potential events that may impact a customer's well-being may be of high significance to the enterprise organization.

Some aspects of the disclosure relate to utilizing machine learning models to detect patterns of customer activity, identify relevant resources offered by businesses, identify customer preferences, and provide timely and effective options to the customer. Fast information processing, fast data transmission rates, availability of bandwidth, and so forth may be significant factors in automatically pairing customers and businesses.

Figure 1A:
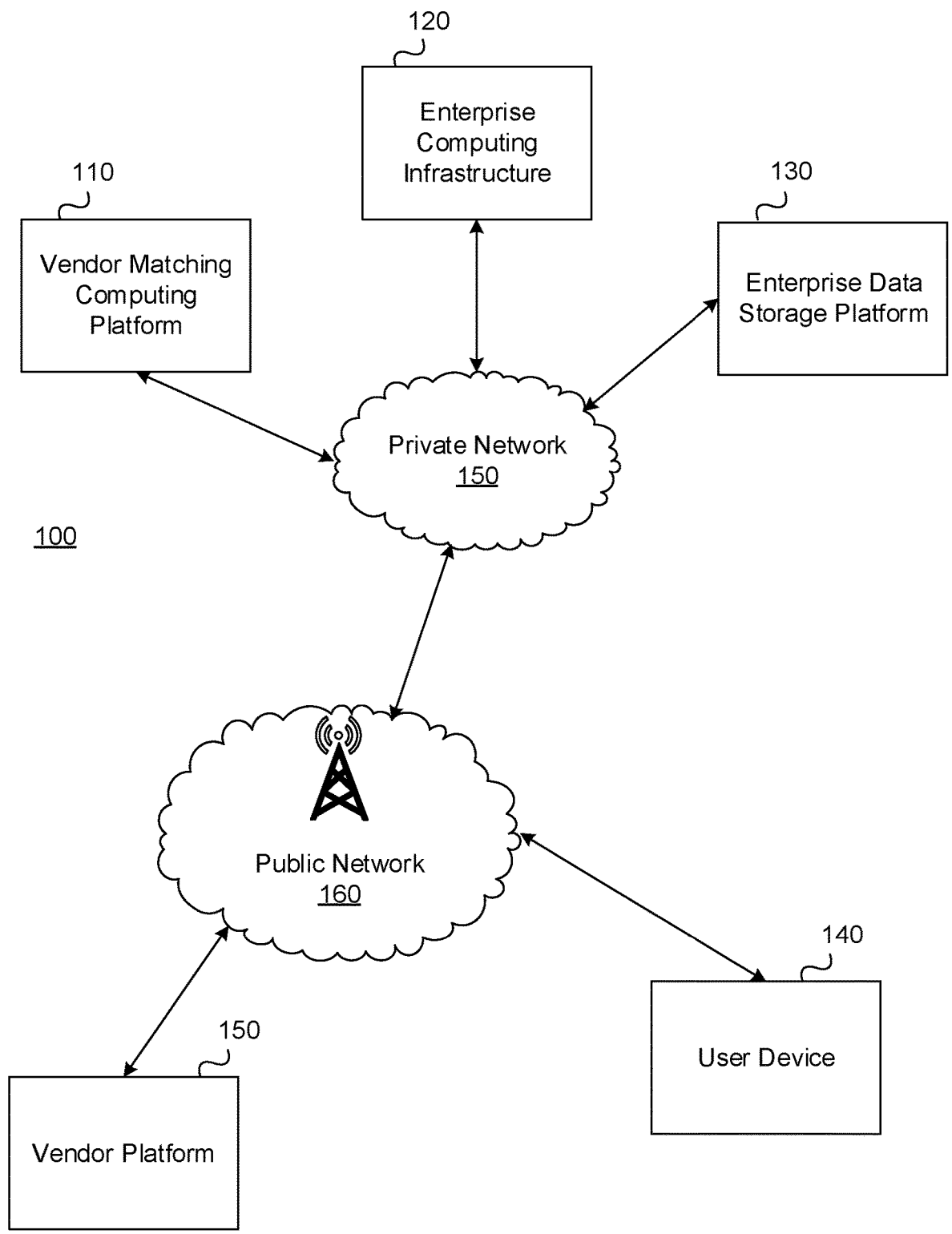
FIGS. 1A and 1B depict an illustrative computing environment for machine learning based automated pairing of customers and businesses.
Figure 1B:
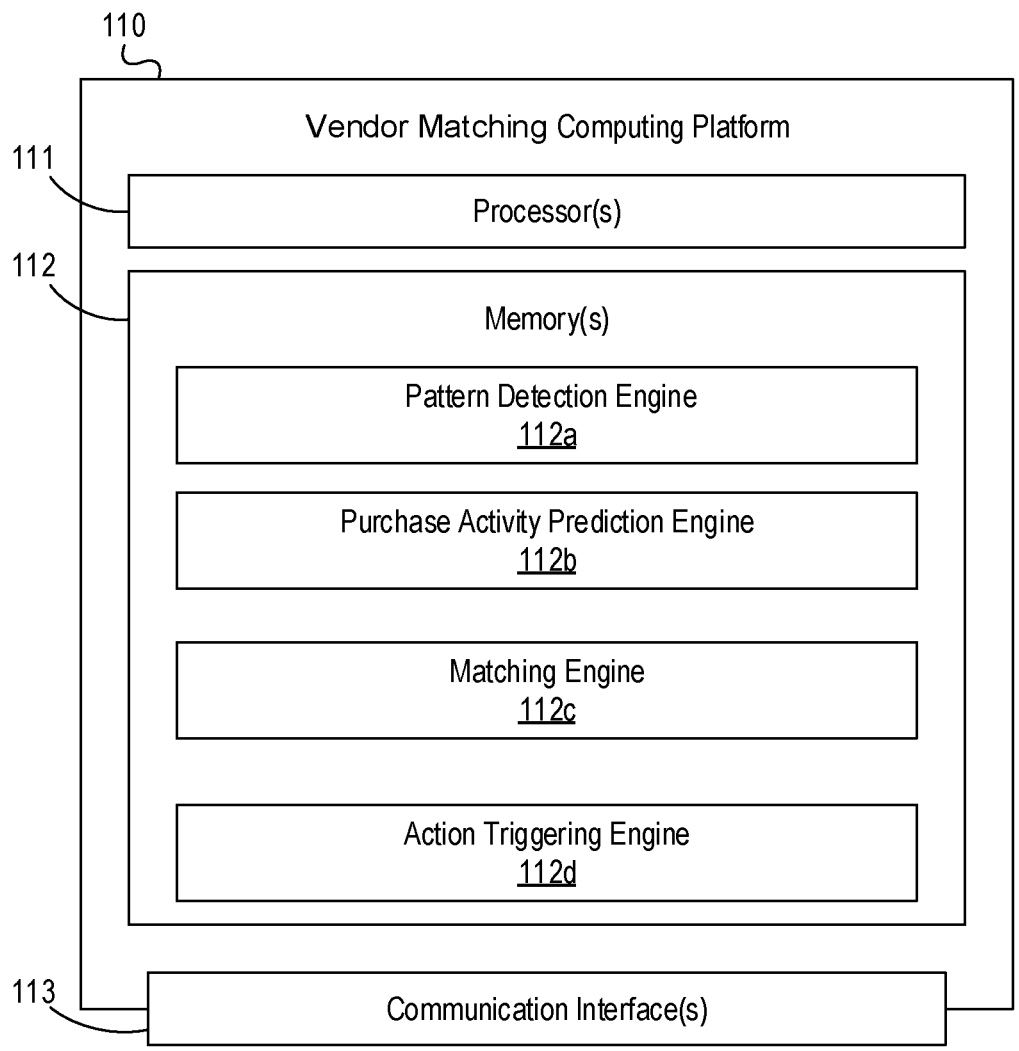

FIGS. 1A and 1B depict an illustrative computing environment for automated pairing of individual customers and businesses. Referring to FIG. 1A, computing environment 100 may include one or more computer systems. For example, computing environment 100 may include a vendor matching computing platform 110, enterprise computing infrastructure 120, an enterprise data storage platform 130, a user device 140, and a vendor platform 150.

As illustrated in greater detail below, vendor matching computing platform 110 may include one or more computing devices configured to perform one or more of the functions described herein. For example, vendor matching computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more vendor platforms to provide goods and services, transaction processing programs, an enterprise mobile application for user devices, automated payment functions, loan processing programs, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally or alternatively, enterprise computing infrastructure 120 may receive instructions from vendor matching computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, for enterprise customers, account information, payment information, payment schedules, patterns of activity, product and service offerings, discounts, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

User device 140 may be a personal computing device (e.g., desktop computer, laptop computer) or mobile computing device (e.g., smartphone, tablet, wearable device). In addition, user device 140 may be linked to and/or used by a specific user (who may, e.g., be a customer of a financial institution or other organization operating vendor matching computing platform 110). Also, for example, user of user device 140 may use user device 140 to perform transactions (e.g., perform banking operations, perform financial transactions, trade financial assets, and so forth) and purchase activities (e.g., buy and/or sell products and services).

Vendor platform 150 may include one or more computers (e.g., laptop computers, desktop computers, servers, server blades, or the like) and/or other computer components (e.g., processors, memories, communication interfaces). Vendor platform 150 may generally be a platform to provide products and services, odder discounts, coupons, promotions, and so forth. For example, vendor platform 150 may be a platform for mortgage loan payments. As another example, vendor platform 150 may be a platform for loan applications. Also, for example, vendor platform 150 may be a platform for a utility company, a telecommunications company, a credit card company, a pharmacy, auto repair services, home improvement goods and/or services, legal services, and so forth. Although not illustrated herein, in some embodiments, vendor platform 150 may be a component of vendor matching computing platform 110, or may be a standalone component connected to private network 160. Also, for example, vendor platform 150 may represent a plurality of platforms.

Computing environment 100 also may include one or more networks, which may interconnect one or more of vendor matching computing platform 110, enterprise computing infrastructure 120, enterprise data storage platform 130, user device 140, and vendor platform 150. For example, computing environment 100 may include a private network 160 (which may, e.g., interconnect vendor matching computing platform 110, enterprise computing infrastructure 120, enterprise data storage platform 130, and/or one or more other systems which may be associated with an organization, such as a financial institution) and public network 170 (which may, e.g., interconnect user device 140 and vendor platform 150 with private network 160 and/or one or more other systems, public networks, sub-networks, and/or the like). Public network 170 may be a high generation cellular network, such as, for example, a 5G or higher cellular network. In some embodiments, private network 160 may likewise be a high generation cellular enterprise network, such as, for example, a 5G or higher cellular network.

In one or more arrangements, enterprise computing infrastructure 120, enterprise data storage platform 130, user device 140, vendor platform 150, and/or the other systems included in computing environment 100 may be any type of computing device capable of receiving input via a user interface, and communicating the received input to one or more other computing devices. For example, enterprise computing infrastructure 120, enterprise data storage platform 130, user device 140, and vendor platform 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of vendor matching computing platform 110, enterprise computing infrastructure 120, enterprise data storage platform 130, user device 140, and vendor platform 150, may, in some instances, be special-purpose computing devices configured to perform specific functions.

Referring to FIG. 1B, vendor matching computing platform 110 may include one or more processors 111, memory 112, and communication interface 113. A data bus may interconnect processor 111, memory 112, and communication interface 113. Communication interface 113 may be a network interface configured to support communication between vendor matching computing platform 110 and one or more networks (e.g., network 150, network 160, a local network, or the like). Memory 112 may include one or more program modules having instructions that when executed by processor 111 cause vendor matching computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of vendor matching computing platform 110 and/or by different computing devices that may form and/or otherwise make up vendor matching computing platform 110. For example, memory 112 may have, store, and/or include a pattern detection engine 112a, a purchase activity prediction engine 112b, a matching engine 112c, and an action triggering engine 112d.

Pattern detection engine 112a may have instructions that direct and/or cause vendor matching computing platform 110 to determine, via a computing device and based on historical user activity of a user, a pattern of the user activity, as discussed in greater detail below. Purchase activity prediction engine 112b may have instructions that direct and/or cause vendor matching computing platform 110 to identify, based on the pattern of the user activity, one or more anticipated purchase activities of the user. In some embodiments, purchase activity prediction engine 112b may have instructions that direct and/or cause vendor matching computing platform 110 to determine, via the computing device and based on the one or more anticipated purchase activities of the user, a sales offering by a vendor. Matching engine 112c may have instructions that direct and/or cause vendor matching computing platform 110 to match, via the computing device, the one or more anticipated purchase activities of the user with the sales offering by the vendor. In some embodiments, matching engine 112c may have instructions that direct and/or cause vendor matching computing platform 110 to retrieve, from a repository of user data and for a purchase activity of the one or more anticipated purchase activities, one or more user-defined preference rules associated with the purchase activity. In some embodiments, matching engine 112c may have instructions that direct and/or cause vendor matching computing platform 110 to determine whether the one or more preference rules apply to one or more attributes of the purchase activity. Action triggering engine 112d may have instructions that direct and/or cause vendor matching computing platform 110 to trigger, via the computing device and based on a determination that the one or more preference rules apply to the one or more attributes of the purchase activity, an action associated with the purchase activity.

Figure 2A:
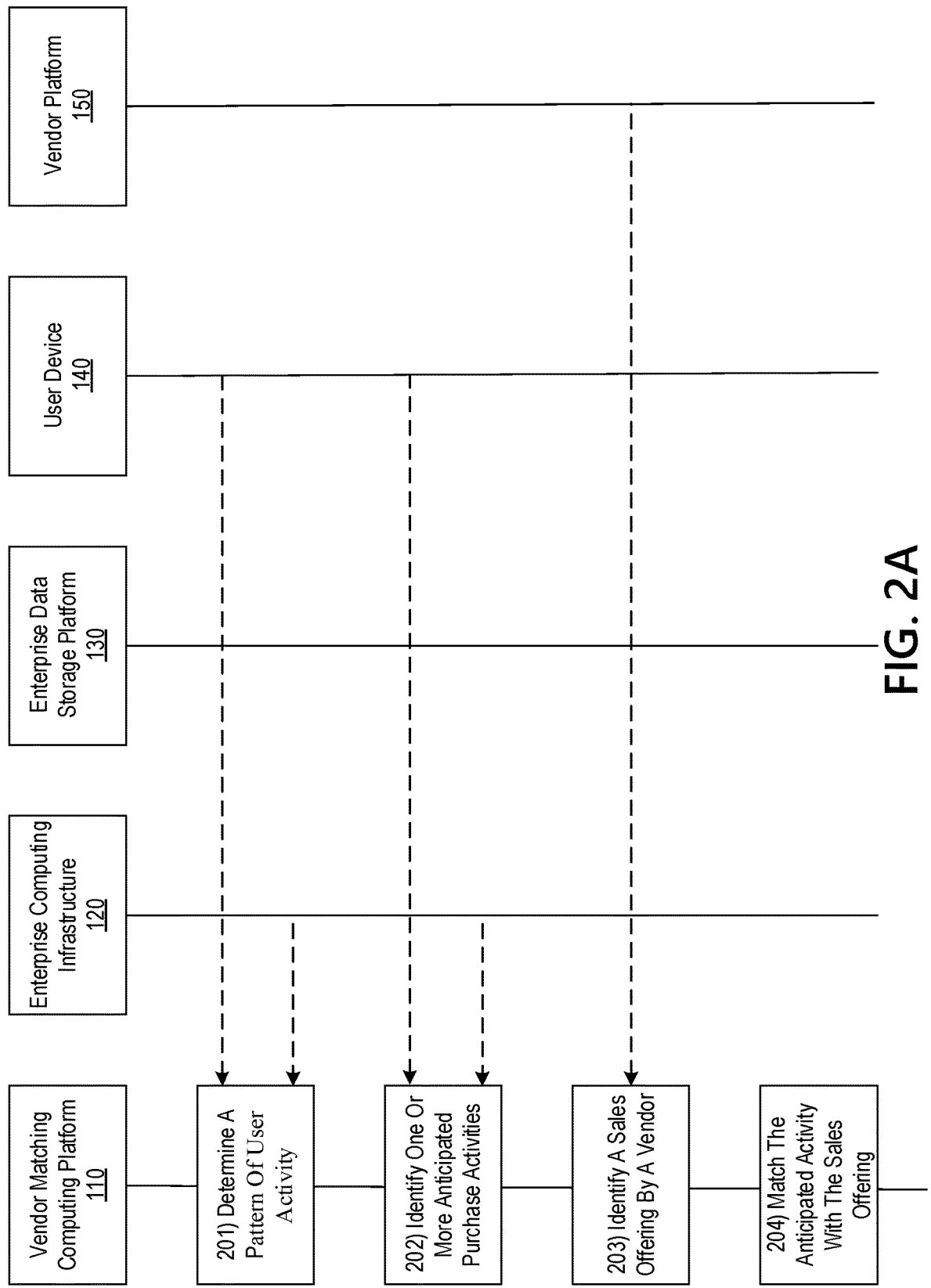
FIGS. 2A and 2B depict an illustrative event sequence for machine learning based automated pairing of customers and businesses.
Figure 2B:
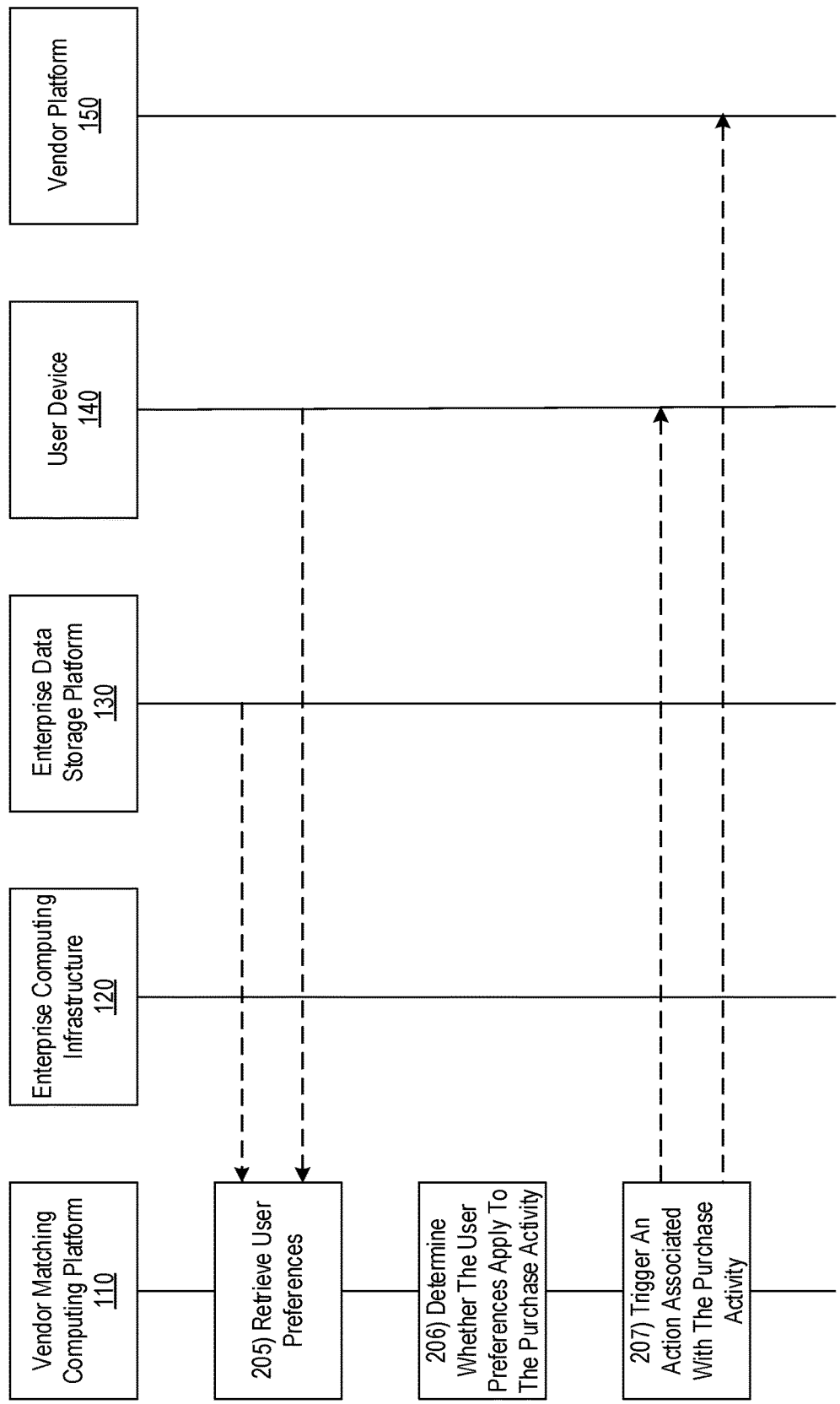

FIGS. 2A and 2B depict an illustrative event sequence for automated pairing of customers and businesses. Referring to FIG. 2A, at step 201, vendor matching computing platform 110 may determine, via a computing device and based on historical user activity of a user, a pattern of the user activity. For example, the user may perform various purchase transactions, and vendor matching computing platform 110 may store a record of such transactions in an enterprise storage platform (e.g., enterprise storage platform 130). For example, a user may purchase a certain item from a certain vendor at regular intervals. Also, for example, a user may configure one or more payments for transactions (e.g., credit card payments, utility bill payments, mortgage payments, and so forth) to be electronically paid. In some instances, such payments may be periodic, and may be paid automatically. Accordingly, vendor matching computing platform 110 may determine a pattern of such transactions, including a vendor, relevant goods and/or services, a payee, an amount of payment, a time of recurrence, a mode of payment, a pattern of late payments, a pattern of minimum payments, and so forth. In some embodiments, vendor matching computing platform 110 may maintain a record of a user's login activity on a website or a mobile application.

In some embodiments, vendor matching computing platform 110 may train a machine learning model to determine the pattern of the user activity. For example, clustering algorithms may be utilized to determine patterns of behaviors for users. For example, the clustering algorithm may take, as input, one or more attributes of user behavior, and classify users based on such behaviors. The one or more attributes may include consumer behavior, income activity, spending activity, credit rating patterns, loan activity, risk appetites, and so forth. In some embodiments, unsupervised learning algorithms, such as K-means clustering, principal component analysis, and so forth may be utilized. Accordingly, customers may be associated with clusters based on their patterns of activity.

In some instances, a customer may be incapacitated and/or otherwise unable to make their regular purchases. For example, the customer may be unwell, hospitalized, and/or incapacitated for a short-term or long-term, and so forth. Also, for example, the customer may have lost employment. As another example, the customer may have reduced income from a job, business, or other source of revenue. Also, for example, the customer may be in a geographical location that has experienced a natural disaster (e.g., earthquake, fire, volcanic eruption, flooding, hurricane, tornado, winter storm, and so forth), and the customer may not have access to their account. As another example, the customer may be in a location that is experiencing an emergency. In such circumstances, a customer may be subjected to further hardship due to increased bills, non-payment of bills, surmounting interest payments, fines for late and/or missed payments, and so forth. Accordingly, an enterprise organization may provide relief to customers by detecting such circumstances, identifying available resources that may benefit the customer, and providing such resources to the customer in a timely and effective manner.

At step 202, vendor matching computing platform 110 may identify, based on the pattern of the user activity, one or more anticipated purchase activities of the user. Generally, vendor matching computing platform 110 may determine behavior patterns for a user based on purchase activity, and along with information about their physical location, purchase history, spending habits, and so forth, vendor matching computing platform 110 may detect changes indicative of a need for help. Accordingly, vendor matching computing platform 110 may identify goods and/or services offered by business customers, such as, for example, loans programs, discounts, rebates, promotions, and so forth.

For example, vendor matching computing platform 110 may identify that a customer purchases a product at regular intervals of time. Accordingly, vendor matching computing platform 110 may identify the one or more anticipated purchase activities of the user as a next purchase of the product. As another example, vendor matching computing platform 110 may identify that a customer purchases groceries from an online vendor at regular intervals of time. Accordingly, vendor matching computing platform 110 may identify the one or more anticipated purchase activities of the user as a next purchase of the groceries.

As another example, vendor matching computing platform 110 may identify that a customer may be going for an annual eye examination, and purchase prescription eyeglasses, contact lenses, and so forth, from an online vendor at regular intervals of time. Accordingly, vendor matching computing platform 110 may identify the one or more anticipated purchase activities of the user as a next visit to an optometrist, a next purchase of vision related products, and so forth.

In some embodiments, vendor matching computing platform 110 may train a machine learning model to identify the one or more anticipated purchase activities of the user. For example, vendor matching computing platform 110 may detect an increase in a number of bill payments, and may identify the one or more anticipated purchase activities of the user based on the bills, subject to the customer's pre-approval. For example, vendor matching computing platform 110 may receive customer approval to analyze bills to identify a service provider, a type of product, and so forth. As another example, vendor matching computing platform 110 may detect, from data based on an email service, that there is an increased activity related to auto insurance, including, for example, a rental car transaction, calendar schedules for an auto body repair shop, and so forth. Accordingly, vendor matching computing platform 110 may determine that an automobile accident may have occurred, and may identify the one or more anticipated purchase activities of the user based on the insurance related activity.

At step 203, vendor matching computing platform 110 may determine, via the computing device and based on the one or more anticipated purchase activities of the user, a sales offering by a vendor. The term "sales offering" as used herein, may be an offering of a product and/or service by a business. In some embodiments, the business may be a business customer of an enterprise organization. Similarly, a "customer" may be an individual customer of the enterprise organization, and/or a business customer. For example, vendor platform 150 may be a platform associated with a customer that offers products and/or services. In some embodiments, such products and/or services may be provided at discounted rates to enterprise customers. Accordingly, vendor matching computing platform 110 may analyze products and/or services offered by businesses. In some embodiments, vendor matching computing platform 110 may classify products and/or services based on customer needs, consumer habits, and so forth. In some embodiments, vendor platform 150 may be a virtual marketplace hosted by enterprise computing infrastructure for its customers to transact business, promote sales for small businesses, optimize costs for its customers, and so forth.

In some embodiments, vendor matching computing platform 110 may determine the sales offering based on geographic proximity to the customer. For example, a customer may be purchasing gas at a gas station that may be 3 miles away. However, a business customer of the enterprise may be offering a discount to enterprise customers, and the business customer may be operating a gas station within a block of the customer's residence. Accordingly, vendor matching computing platform 110 may determine the sales offering as the discount offered by the business customer operating the nearby gas station. As another example, a customer may be purchasing vison care products online, and a business customer of the enterprise may be offering a discount to enterprise customers, and the business customer may be operating a vision care store within a mile of the customer's residence. Accordingly, vendor matching computing platform 110 may determine the sales offering as the discount offered by the business customer operating the nearby vision care store. Vendor matching computing platform 110 may identify similar local and/or proximate vendors for purchase of groceries, exercise gyms, recreation services, auto rental services, and so forth.

At step 204, vendor matching computing platform 110 may match, via the computing device, the one or more anticipated purchase activities of the user with the sales offering by the vendor. Generally, based on identifying patterns of activity for the user, an enterprise organization may be able to analyze the user's purchase behavior and determine insights into what a consumer purchases, where they purchase it from, when they purchase, how much they may pay for the purchase, and so forth. Also, for example, the enterprise organization may be able to analyze the offerings of its business customers, and determine potentially niche markets for their offerings. Accordingly, the enterprise organization may be able to provide cost savings to customers, while also promoting business for its business customers.

For example, during a natural disaster and/or a public emergency, supplies for one or more items may not be sufficient to meet customer demand. However, an enterprise organization may be able to identify a demand for the one or more items among its customers, and provide such information to business customers (e.g., via vendor platform 150), who may then tailor their products and services to the customer demand. For example, customers in an area hit by the natural disaster and/or public emergency, may need emergency food supplies, transportation, and so forth. Accordingly, vendor matching computing platform 110 may match these customers to businesses that may be providing special discounts, products, services, for such customers.

As described herein, a machine learning model may analyze customers and businesses, based on factors such as consumer habits, purchase activities, geographic location, and so forth. Based on the analyzing, the machine learning model may identify patterns and/or correlations among the factors, and identify a match. In some embodiments, the machine learning model may be trained to run an optimization algorithm that may optimize an availability of resources by minimizing cost, minimizing distance from a customer to a vendor, minimizing a time taken to provide the goods and/or services, and so forth. For example, the machine learning model may determine a frequency of a purchase (e.g., based on historical activity), a gas purchase (e.g., based on a make and model of a car, amount driven, and so forth), purchase of groceries, and so forth.

Referring to FIG. 2B, at step 205, vendor matching computing platform 110 may retrieve, from a repository of user data and for a purchase activity of the one or more anticipated purchase activities, one or more user-defined preference rules associated with the purchase activity. For example, vendor matching computing platform 110 may collect, from the user, preferences regarding various purchase activities, and store the preferences in a repository (e.g., enterprise data storage platform 130).

In some embodiments, a machine learning model may learn user preferences from the patterns of historical activity, and vendor matching computing platform 110 may provide the user with such recommended preferences. For example, the machine learning model may be trained to learn user preferences (e.g., prefer to drive, walk, bike, and so forth), how far a user may prefer to drive to purchase certain products and/or services, and so forth. For example, the user may prefer to walk to the local grocery store, but may also prefer to drive 15 miles to shop at an outlet store. Also, for example, the user may prefer to drive one mile to a store to purchase a product, but may not prefer to drive 20 miles to purchase the same product, even at a discounted price.

In some embodiments, the user may interact with vendor matching computing platform 110 to refine the preferences, accept and/or reject the preferences. For example, a customer may set up parameters for various purchase activities. For example, the customer may indicate a preference to purchase a product from a store that may be further than 20 miles from the customer's residence if the product is available at a discount of, say, for example, 25%. Also, for example, the customer may indicate a preference to purchase non-perishable items online, and purchase perishable items from a local store. As another example, on their commute to work, the customer may prefer to visit a gas station that sells coffee and donuts. As another example, during weekends, the customer may prefer to travel to nearby attractions.

In some embodiments, the one or more user-defined preference rules may include one or more of a preference associated with an automatic loan amount, a secondary funding source, automatic payment options, a designated alternate decision making authority, and preferred communication channels. The one or more user-defined preferences may generally relate to aspects of a purchase activity, such as, for example, an amount of loan, a level of risk, an amount of payments, a source of funding, an authorized user, a preferred mode of communication, and so forth. In some instances, the user-define preferences may indicate a type of purchase activity that the user may want vendor matching computing platform 110 to perform automatically. For example, a user may allow vendor matching computing platform 110 to make automatic periodic purchases of household items such as toilet paper, toothpaste, shampoo, soap, dishwashing detergent, laundry detergent, and so forth.

In some embodiments, the one or more user-defined preferences may include an indication by the user to allocate a source of funding for a purchase. As another example, the user may indicate a percentage of an outstanding purchase payment that may be automatically paid. In some embodiments, the one or more user-defined preferences may include an indication by the customer to add such parameters for a purchase activity. For example, the user may allow vendor matching computing platform 110 to automatically manage all aspects of forthcoming purchase activities. Also, for example, the user may identify certain types of purchase activities that may be automatically managed by vendor matching computing platform 110. In some instances, the user may set time limits for various purchase related activities, and may pre-authorize vendor matching computing platform 110 to make purchases after the time limit expires. In some embodiments, the user may indicate an amount of loan that the user may pre-authorize for a purchase activity. For example, the user may set limits for an amount of credit that may be applied to a credit card for specific purchases. Also, for example, the user-defined preferences may indicate a pre-authorization of an automatic interest free loan for certain purchases (e.g., for purchase of large electronic items).

Also, for example, the user-defined preferences may indicate that the user prefers to communicate via email, and vendor matching computing platform 110 may contact the user via telephone only after a predetermined number of attempts to communicate via email. As another example, the user may designate another individual as a responsible party who may be contacted when the user is incapacitated. For example, a college student may authorize an established process to inform a parent or a guardian of a need for the student. For example, the college student may receive periodic supplies from their parent, and vendor matching computing platform 110 may contact their parent to facilitate purchase of the supplies, and shipment of the supplies to the student.

Generally, vendor matching computing platform 110 may determine and store the one or more user-defined preferences prior to a time when vendor matching computing platform 110 may make automatic purchases and so forth. Accordingly, a customer may be presented with an opportunity to avail of preferred and/or cost-effective options for products and/or services.

In some embodiments, vendor matching computing platform 110 may determine the one or more user-defined preference rules by establishing, via an intelligent virtual assistant, an interactive session with the user. For example, an intelligent chat bot may utilize natural language processing to converse with the user. The intelligent virtual assistant may access an enterprise server (e.g., enterprise computing infrastructure 120) to identify one or more resources offered by business customers. For example, the information for available resources may be organized in a hierarchical tree structure, and the intelligent virtual assistant may traverse this tree based on an interactive question-answer (Q/A) session with the user.

Then, vendor matching computing platform 110 may provide, to the user, one or more questions in sequential format. In some embodiments, the sequential format may be based on the hierarchical tree structure. For example, vendor matching computing platform 110 may ask "Would you like us to purchase the household items listed below?" Also, for example, vendor matching computing platform 110 may ask "Would you like to withdraw funds from your savings account to pay the pharmacy for your monthly purchase?"

Then, vendor matching computing platform 110 may receive, from the user, responses to the one or more questions. For example, the user may respond "Yes" to the question, "Would you like us to purchase the household items listed below?" In some embodiments, the user may respond "Yes, but do not pay the entire balance." Additional and/or alternate user responses may be received.

Subsequently, vendor matching computing platform 110 may provide, to the user and based on the responses, one or more additional questions. For example, vendor matching computing platform 110 may ask "Would you like to explore discounted prices for the products?" As another example, vendor matching computing platform 110 may ask "Would you like to pre-approve an interest free loan to pay for your purchase?" Then, vendor matching computing platform 110 may receive, from the user, responses to the one or more additional questions. For example, the user may respond "Yes" to a pre-approved loan, and vendor matching computing platform 110 may ask the user to provide a range for the pre-approved loan.

As described herein, vendor matching computing platform 110 may train the intelligent virtual assistant based on a machine learning model to analyze the responses, determine services available, and tailor the services to a user based on detected patterns of purchase activity. For example, a user may historically purchase online. Accordingly, vendor matching computing platform 110 may not ask the user "Would you like us to place an order at your local pharmacy?" and may instead ask, "Would you like us to place an order at your preferred online pharmacy?" In some embodiments, vendor matching computing platform 110 may determine that a generic form may be available at the local store, and may ask, "We know you prefer to purchase online, but your local store is offering a generic version at a 25% discount. This may lead to a total savings of $49.99."

In some embodiments, intelligent virtual assistant may integrate with one or more external artificial intelligence (AI) systems to provide recommendations to a user. Such AI systems may include, for example, a weather system, a news analysis system, a stock market analysis system, a virtual assistant associated with mobile devices, a consumer behavior analysis system, an email analysis system, and so forth.

Generally, the intelligent virtual assistant may utilize an AI machine learning system to initiate automated matching of customers and vendors, provide messaging updates to the customer, receive user preferences, and so forth. In some embodiments, the AI system may proactively message the customer to provide updates about anticipated purchases, account activity, account balance, and so forth. As described herein, the messages may be sent via a natural language processing system. Such messages may be sent via an SMS service, and may assume that the customer has a minimum level of internet connectivity. In some embodiments, the virtual assistant may interact with the customer via a telephone, a personal computer, a mobile device, a video link, and so forth. Also, for example, the virtual assistant may be configured to interact with the customer via a variety of channels, operating systems, natural languages, and so forth.

At step 206, vendor matching computing platform 110 may determine whether the one or more preference rules apply to one or more attributes of the purchase activity. For example, vendor matching computing platform 110 may identify the anticipated purchase activity as a monthly purchase of prescription, and the user-defined preference may indicate that the user has approved automatic purchase from an online pharmacy. As another example, one or more attributes of the payment may relate to how payment for a purchase is to be made, a source of the funding, an amount of the payment, whether an automatic loan may apply toward payment for the purchase, and so forth. Accordingly, vendor matching computing platform 110 may determine whether the user-defined preferences apply to the one or more attributes of the purchase.

As another example, the anticipated purchase activity may be a grocery purchase, and one or more attributes of the purchase may relate to items that may be automatically ordered online, and items that may need to be purchased at a local grocery store. Accordingly, vendor matching computing platform 110 may determine whether the user-defined preferences apply to the one or more attributes of the grocery purchase.

Also, for example, the anticipated purchase activity may occur when a user is likely to be incapacitated. For example, vendor matching computing platform 110 may determine that the user is undergoing treatment and is unable to access the account to make purchases. Accordingly, vendor matching computing platform 110 may identify one or more attributes of the purchase activity to be whether the user has approved automatic purchases, whether the user has designated an authorized individual to manage and/or approve a payment for the purchase, whether the user has pre-approved a loan for the purchase, whether the user has arranged for a source of funding for the purchase, whether the user has a preferred vendor for the purchase, and so forth.

As another example, vendor matching computing platform 110 may determine that the user is located in an area that has been visited by a natural disaster, and vendor matching computing platform 110 may determine that the user is unable to access a preferred mode of communication. Accordingly, the one or more attributes of an anticipated transaction may include an alternate mode of communication preferred by the user. For example, the internet coverage may have been affected, and vendor matching computing platform 110 may determine that the user is not able to connect to the internet to receive email communications, or log in to their account. Accordingly, vendor matching computing platform 110 may determine SMS messaging as a user-defined alternate mode of communication.

At step 207, vendor matching computing platform 110 may trigger, via the computing device and based on a determination that the one or more preference rules apply to the one or more attributes of the purchase activity, an action associated with the purchase activity. For example, vendor matching computing platform 110 may identify the anticipated purchase activity as a monthly purchase of prescription, and the user-defined preference may indicate that the user has approved automatic purchase from an online pharmacy. Accordingly, vendor matching computing platform 110 may trigger an automatic purchase of the prescription from the online pharmacy. Also, for example, the one or more attributes of the payment may relate to when the payment is to be made, a source of the funding, an amount of the payment, whether an automatic loan may apply toward the payment, and so forth, and vendor matching computing platform 110 may trigger the automatic payment for the purchase in accordance with the one or more attributes of the purchase activity.

As another example, the anticipated purchase activity may be a grocery purchase, and one or more attributes of the purchase may relate to items that may be automatically ordered online, and items that may need to be purchased at a local grocery store. Accordingly, vendor matching computing platform 110 may trigger the automatic purchase of the items that may be automatically ordered online. Also, for example, vendor matching computing platform 110 may, for the items that may need to be purchased at a local grocery store, identify coupons available at local stores, determine a total cost for the items, and provide the customer with a list of grocery stores, their distances from a residence of the customer, and an estimated price for the grocery items based on applicable discounts.

Also, for example, the anticipated purchase activity may occur when a user is likely to be incapacitated, and vendor matching computing platform 110 may trigger action on the anticipated purchase activity in accordance with the one or more attributes of the anticipated purchase activity. For example, vendor matching computing platform 110 may determine that the user has designated an authorized individual to approve a payment for the purchase activity, and vendor matching computing platform 110 may trigger contact with the authorized individual. As another example, vendor matching computing platform 110 may determine that the user has pre-approved a loan for the purchase activity, and vendor matching computing platform 110 may trigger application of the loan as payment to the purchase.

As another example, vendor matching computing platform 110 may determine that the user is located in an area that has been visited by a natural disaster, and vendor matching computing platform 110 may determine that the user has designated a preferred mode of communication. Accordingly, vendor matching computing platform 110 may trigger contact with the user via the designated alternate mode of communication.

Also, for example, vendor matching computing platform 110 may determine that the user is located in an area that has been visited by a natural disaster, and vendor matching computing platform 110 may determine that the user may need help with insurance claims, bridge loans, home repair, automobile repair, and so forth. Accordingly, vendor matching computing platform 110 may identify businesses that may tailor provision of goods and/or services to affected customers, and provide the goods and/or services based on user-defined preferences.

In some embodiments, vendor matching computing platform 110 may retrieve, from one or more external sources of data, one or more events that may impact the purchase activity. As described herein, the user may be located in a geographical area that may have experienced a weather related event (e.g., snowstorm, hurricane, tornado, volcanic eruption, floods, forest fires, and so forth), a public care related event, and so forth. Generally, such events may disrupt a customer's ability to access their account, and/or make purchase activities. In some embodiments, the one or more external sources of data may be artificial intelligence based systems. In some embodiments, the event may include one or more of a weather related event, an employment related event, a geopolitical event, and the like. Vendor matching computing platform 110 may retrieve data related to the event from an external weather system, a traffic alert system, a news agency, and so forth.

Then, vendor matching computing platform 110 may identify an event of the one or more events that impacts the purchase activity, where the action associated with the purchase activity comprises a recommendation that minimizes the impact of the event for the user. For example, the event may be a natural disaster, such as, for example, a hurricane. The customer may have lost their house, or may have lost electrical power. Vendor matching computing platform 110 may identify customers who may be in a zip code affected by the natural disaster, and may match the customers to available goods and/or services to proactively address the customer's potential need for such goods and/or services. For example, vendor matching computing platform 110 may identify and/or generate new loan schemes to help affected customers. For example, vendor matching computing platform 110 may provide loans to rebuild a house that has been damaged, and identify construction companies that may be customers that may provide discounted services. In some instances, the loan may be an interest-free loan. Also, for example, the loan may be a bridge loan configured to support a customer while an insurance payout is forthcoming. Generally, vendor matching computing platform 110 may identify resources to and provide these to customers to support them during hardships, and help them return to normalcy.

For example, bureaus of motor vehicle include information related to vehicles that may indicate accidents, and so forth. Also, for example, a customer may authorize access to certain records, and vendor matching computing platform 110 may determine whether the customer has expenses related to those records. As another example, an internet search history may indicate a user's anticipated purchase activity (e.g., travel expenses, construction expenses, home improvement expenses, educational expenses, and so forth). Generally, any information available in the public domain may be retrieved, and/or analyzed, to identify a potential impact to from an event that has occurred.

Figure 3:
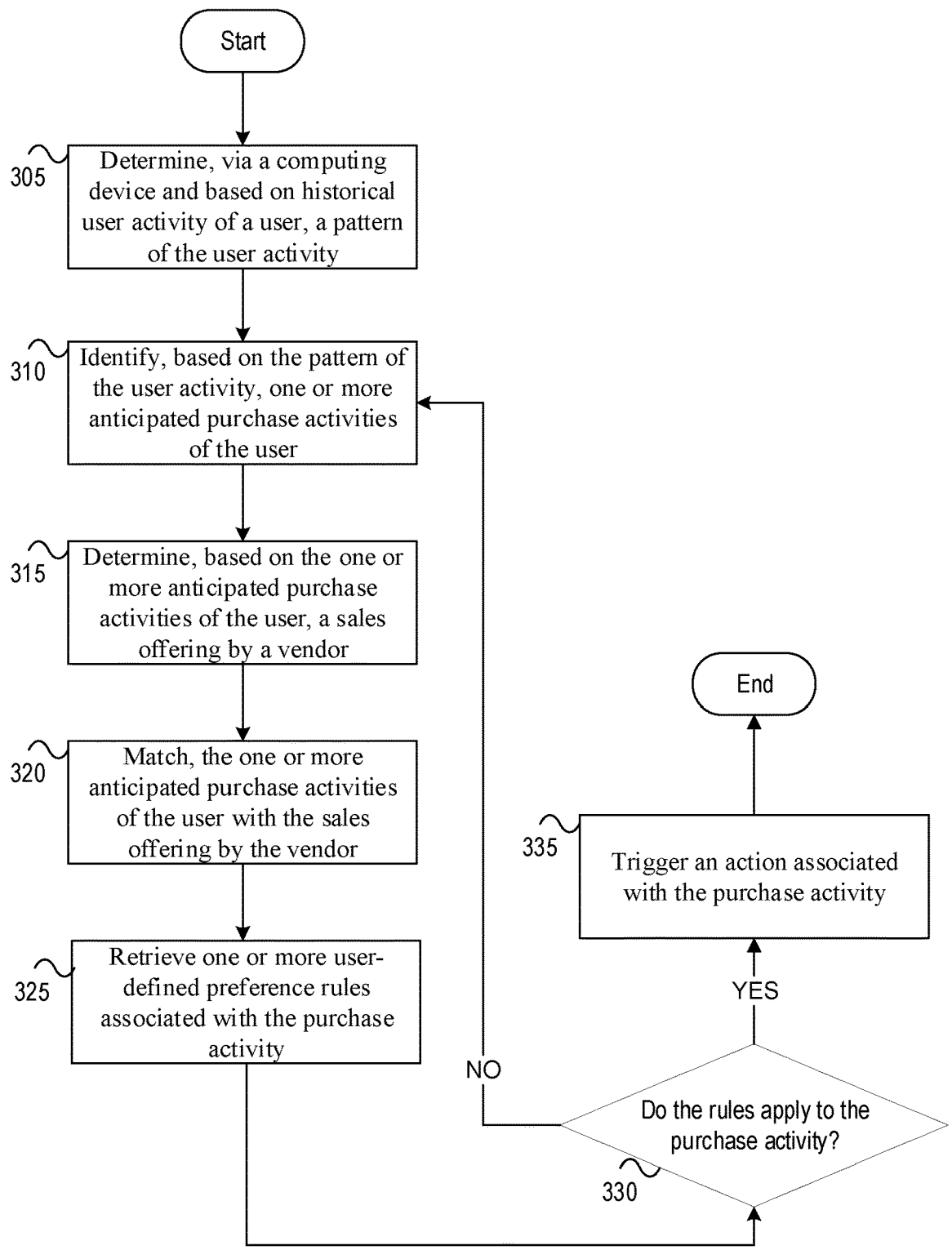
FIG. 3 depicts an illustrative method for machine learning based automated pairing of customers and businesses.

FIG. 3 depicts an illustrative method for automated pairing of customers and businesses. Referring to FIG. 3, at step 305, vendor matching computing platform 110 having at least one processor, and memory may determine, via a computing device and based on historical user activity of a user, a pattern of the user activity. At step 310, vendor matching computing platform 110 may identify, based on the pattern of the user activity, one or more anticipated purchase activities of the user. At step 315, vendor matching computing platform 110 may determine, via the computing device and based on the one or more anticipated purchase activities of the user, a sales offering by a vendor. At step 320, vendor matching computing platform 110 may match, via the computing device, the one or more anticipated purchase activities of the user with the sales offering by the vendor. At step 325, vendor matching computing platform 110 may retrieve, from a repository of user data and for a purchase activity of the one or more anticipated purchase activities, one or more user-defined preference rules associated with the purchase activity. At step 330, vendor matching computing platform 110 may determine whether the one or more preference rules apply to one or more attributes of the purchase activity.

Upon a determination that the one or more preference rules apply to one or more attributes of the purchase activity, the process may proceed to step 335. At step 335, vendor matching computing platform 110 may trigger an action associated with the purchase activity. Upon a determination that the one or more preference rules do not apply to one or more attributes of the purchase activity, the process may return to step 310.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A computing platform, comprising:
at least one processor; and
memory storing computer-readable instructions that, when executed by the at least one processor, cause the computing platform to:
initiate, via an intelligent chat bot, an interactive communication session with a user;
receive, from the user and via the intelligent chat bot, user response data;
process, using natural language processing, the user response data to determine one or more user-defined preference rules for the user;
determine, via a computing device and based on historical user activity of the user, a pattern of the user activity;
identify, based on the pattern of the user activity, one or more anticipated purchase activities of the user;
determine, via the computing device and based on the one or more anticipated purchase activities of the user, a sales offering by a vendor including a discount associated with the one or more anticipated purchase activities of the user;
match, via the computing device, the one or more anticipated purchase activities of the user with the sales offering by the vendor, wherein matching the one or more anticipated purchase activities of the user with the sales offering by the vendor further includes executing, by a machine learning model, an optimization algorithm configured to identify optimized resources;
retrieve, from a repository of user data and for a purchase activity of the one or more anticipated purchase activities, the one or more user-defined preference rules associated with the purchase activity, wherein the one or more user-defined preference rules include a distance a user is willing to travel for a product included in the one or more anticipated purchase activities of the user;
determine whether the one or more user-defined preference rules apply to one or more attributes of the purchase activity;
determine that a user-defined time period has expired;
trigger, via the computing device and based on a determination that the one or more user-defined preference rules apply to the one or more attributes of the purchase activity and based on the determining that the user-defined time period has expired, an action associated with the purchase activity;
determine whether the user is able to connect to the internet;
responsive to determining that the user is able to connect to the internet, provide communications to the user via a first mode of communication;
responsive to determining that the user is not able to connect to the internet, provide communications to the user via a second, different mode of communication; and
wherein the triggering, based on the determination that the one or more user-defined preference rules apply to the one or more attributes of purchase activity and based on the determining that the user-defined time period has expired, the action associated with the purchase activity further includes at least providing communications to the user via one of: the first mode of communication and the second mode of communication.

2. The computing platform of claim 1, wherein the action associated with the purchase activity comprises providing, via the intelligent chat bot, a recommendation to perform the purchase activity.

3. The computing platform of claim 1, wherein the action associated with the purchase activity comprises making an automatic purchase.

4. The computing platform of claim 1, wherein the instructions comprise additional computer-readable instructions that, when executed by the at least one processor, cause the computing platform to:
retrieve, from one or more external sources of data, one or more events that may impact the purchase activity;
identify an event of the one or more events that may impact the purchase activity, and
wherein the action associated with the purchase activity comprises a recommendation that minimizes the impact of the event for the user.

5. The computing platform of claim 4, wherein the one or more external sources of data are artificial intelligence based systems.

6. The computing platform of claim 4, wherein the event comprises one or more of a weather related event, an employment related event, and a geopolitical event.

7. The computing platform of claim 1, wherein the instructions comprise additional computer-readable instructions that, when executed by the at least one processor, cause the computing platform to:
train the intelligent chat bot based on a machine learning model.

8. The computing platform of claim 1, wherein the one or more user-defined preference rules comprise one or more of a secondary funding source, automatic payment options, a designated alternate decision making authority, and preferred communication channels.

9. The computing platform of claim 1, wherein the instructions comprise additional computer-readable instructions that, when executed by the at least one processor, cause the computing platform to:
train a machine learning model to determine the pattern of the user activity.

10. The computing platform of claim 1, wherein the instructions comprise additional computer-readable instructions that, when executed by the at least one processor, cause the computing platform to:
train a machine learning model to identify the one or more anticipated purchase activities of the user.

11. The computing platform of claim 1, wherein the pattern of the user activity includes a pattern of the user purchasing a certain item at particular time intervals.

12. The computing platform of claim 1, wherein the discount associated with the one or more anticipated purchase activities of the user is determined based on geographic proximity of the vendor to the user.

13. A method, comprising:
at a computing platform comprising at least one processor, at least one physical sensor communicatively coupled to the at least one processor, and memory:
initiate, via an intelligent chat bot, an interactive communication session with a user;
receive, from the user and via the intelligent chat bot, user response data;
process, using natural language processing, the user response data to determine one or more user-defined preference rules for the user;
determining, via a computing device and based on historical user activity of a user, a pattern of the user activity;
identifying, based on the pattern of the user activity, one or more anticipated purchase activities of the user;
determining, via the computing device and based on the one or more anticipated purchase activities of the user, a sales offering by a vendor including a discount associated with the one or more anticipated purchase activities of the user;
matching, via the computing device, the one or more anticipated purchase activities of the user with the sales offering by the vendor, wherein matching the one or more anticipated purchase activities of the user with the sales offering by the vendor further includes executing, by a machine learning model, an optimization algorithm configured to identify optimized resources;
retrieving, from a repository of user data and for a purchase activity of the one or more anticipated purchase activities of the user, the one or more user-defined preference rules associated with the purchase activity, wherein the one or more user-defined preference rules include a distance a user is willing to travel for a product included in the one or more anticipated purchase activities of the user;
determining whether the one or more user-defined preference rules apply to one or more attributes of the purchase activity;
determining that a user-defined time period has expired;
triggering, via the computing device and based on a determination that the one or more user-defined preference rules apply to one or more attributes of the purchase activity and based on the determining that the user-defined time period has expired, an action associated with the purchase activity;
determining whether the user is able to connect to the internet;
responsive to determining that the user is able to connect to the internet, providing communications to the user via a first mode of communication;
responsive to determining that the user is not able to connect to the internet, providing communications to the user via a second, different mode of communication; and
wherein the triggering, based on the determination that the one or more user-defined preference rules apply to the one or more attributes of purchase activity and based on the determining that the user-defined time period has expired, the action associated with the purchase activity further includes at least providing communications to the user via one of: the first mode of communication and the second mode of communication.

14. The method of claim 13, wherein the action associated with the purchase activity comprises providing, via the intelligent chat bot, a recommendation to perform the purchase activity.

15. The method of claim 13, wherein the action associated with the purchase activity comprises making an automatic purchase.

16. The method of claim 13, further comprising:
retrieving, from one or more external sources of data, one or more events that may impact the purchase activity;
identifying an event of the one or more events that may impact the purchase activity, and
wherein the action associated with the purchase activity comprises a recommendation that minimizes the impact of the event for the user.

17. The method of claim 16, wherein the event comprises one or more of a weather related event, an employment related event, and a geopolitical event.

18. The method of claim 16, wherein the one or more external sources of data are artificial intelligence based systems.

19. One or more non-transitory computer-readable media storing instructions that, when executed by a computing platform comprising at least one processor, at least one physical sensor communicatively coupled to the at least one processor, and memory, cause the computing platform to:
- initiate, via an intelligent chat bot, an interactive communication session with a user;
- receive, from the user and via the intelligent chat bot, user response data;
- process, using natural language processing, the user response data to determine one or more user-defined preference rules for the user;
- determine, via a computing device and based on historical user activity of the user, a pattern of the user activity;
- identify, based on the pattern of the user activity, one or more anticipated purchase activities of the user;
- determine, via the computing device and based on the one or more anticipated purchase activities of the user, a sales offering by a vendor including a discount associated with the one or more anticipated purchase activities of the user;
- match, via the computing device, the one or more anticipated purchase activities of the user with the sales offering by the vendor, wherein matching the one or more anticipated purchase activities of the user with the sales offering by the vendor further includes executing, by a machine learning model, an optimization algorithm configured to identify optimized resources;
- retrieve, from a repository of user data and for a purchase activity of the one or more anticipated purchase activities, the one or more user-defined preference rules associated with the purchase activity, wherein the one or more user-defined preference rules include a distance a user is willing to travel for a product included in the one or more anticipated purchase activities of the user;
- determine whether the one or more user-defined preference rules apply to one or more attributes of the purchase activity;
- initiate, via an intelligent virtual assistant and based on a determination that the one or more user-defined preference rules apply to the one or more attributes of the purchase activity, an interactive session with the user;
- determine that a user-defined time period has expired;
- trigger, based on the interactive session and after expiration of a predetermined time period, an action associated with the purchase activity;
- determine whether the user is able to connect to the internet;
- responsive to determining that the user is able to connect to the internet, provide communications to the user via a first mode of communication;
- responsive to determining that the user is not able to connect to the internet, provide communications to the user via a second, different mode of communication; and
- wherein the triggering, based on the determination that the one or more user-defined preference rules apply to the one or more attributes of purchase activity and based on the determining that the user-defined time period has expired, the action associated with the purchase activity further includes at least providing communications to the user via one of: the first mode of communication and the second mode of communication.

* * * * *